Aug. 23, 1938.  W. L. HANSEN ET AL  2,128,141
SYNCHRONOUS MOTOR
Filed May 5, 1936
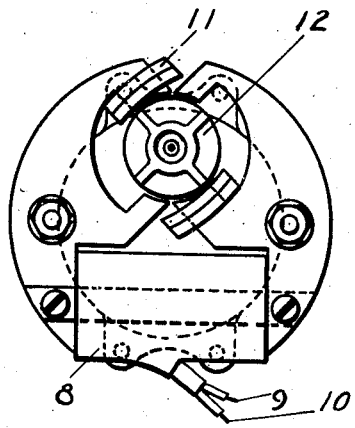
FIG 1
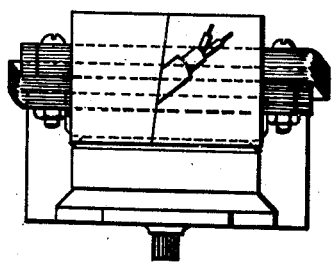
FIG 4
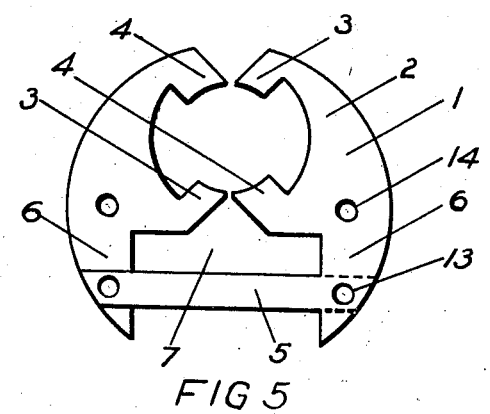
FIG 5
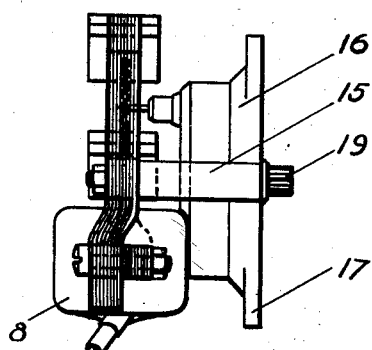
FIG 2
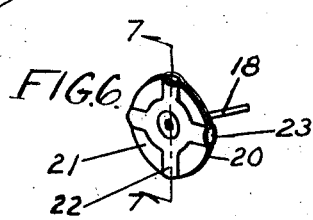
FIG. 6
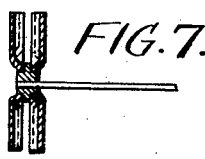
FIG. 7.
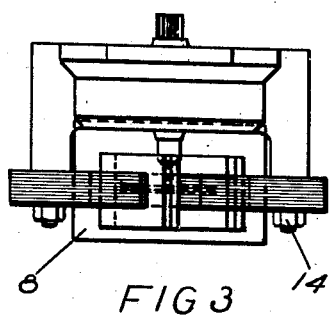
FIG 3
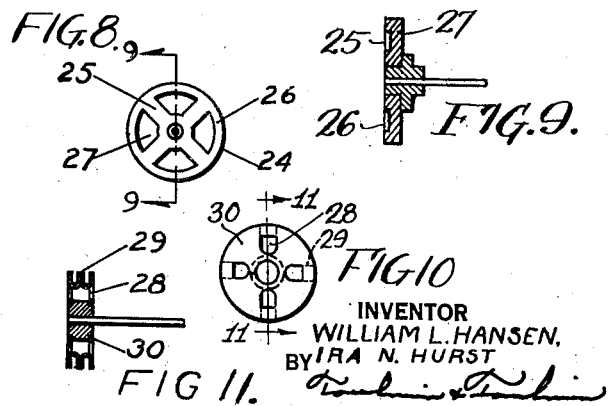
FIG. 8.
FIG. 9.
FIG 10
FIG 11.
INVENTOR
WILLIAM L. HANSEN,
BY IRA N. HURST
ATTORNEYS Patented Aug. 23, 1938

2,128,141

UNITED STATES PATENT OFFICE 2,128,141

SYNCHRONOUS MOTOR

William L. Hansen and Ira N. Hurst, Princeton, Ind., assignors to Hansen Mfg. Company, Inc., Princeton, Ind., a corporation of Indiana Application May 5, 1936, Serial No. 78,002

9 Claims. (Cl. 172—278)

Our invention relates to synchronous motors.

The object of our invention is to provide a sub-synchronous motor of bi-pole construction operating at a speed of 1800 R. P. M., while the normal bi-pole synchronous motor operates at a speed of 3600 R. P. M.

It is our object to provide a balance of the power in the shaded pole construction as compared to that of the unshaded pole.

It is a further object to secure such a result by increasing the size of the shaded pole until the shaded pole balances with the unshaded pole.

It is a further object to provide a rotor of continuous disk form which has a plurality of synchronized poles in the disk such as four synchronizing poles, and by this construction assuring a self-starting motor.

It is our object to provide a rotor of such construction as to bring more metal into the four synchronizing points, as for instance, by making the rotor of thin, heat-treated carbon steel drawn into ridges to bring more metal into certain areas to form synchronizing poles in the rotor disk.

Another method is to press indentations into annealed carbon steel, leaving spoke sections and a rim the full thickness of the metal, and thereafter hardening the disk whereby a self-starting and synchronized motor rotor will result.

It is a further object to provide a rotor having the same characteristics in which punched sections will have the tongues punched from the metal bent back until the end of the tongues just reach the outer rim of the disk.

Referring to the drawing, Figure 1 is a front elevation of the motor.

Figure 2 is a side elevation thereof showing the motor and gear box.

Figure 3 is a top plan thereof.

Figure 4 is a bottom plan.

Figure 5 is a detailed view with the field coils removed of field laminations with the shading plates removed from the poles of the shaded poles.

Figure 6 is a perspective of one of the rotors.

Figure 7 is a section on the line 7—7 of Figure 6.

Figure 8 is a front elevation of an alternative form of one-piece rotor having struck-up ribs and rim.

Figure 9 is a section on the line 9—9 of Figure 8.

Figure 10 is a front elevation of another form of rotor.

Figure 11 is a section on the line 11—11 of Figure 10.

Referring to the drawing in detail, the laminations comprising the magnet field plates of the motor are designated generally 1. These laminations consist of an arcuate portion 2, a relatively small unshaded pole 3 and a relatively large shaded pole 4. One-half of the laminations on one side have the small pole at the top and the large pole at the bottom. The other half of the laminations on the other side have the large pole at the top and the small pole at the bottom.

At the bottom of the laminations are laterally projecting portions 5 extending to and overlapping upon the depending portion 6 of the adjacent laminations. These members 5 bridge the gap 7 between the two sets of laminations, in which gap is mounted the field coil 8, which is connected to a source of electrical energy through the wires 9 and 10 in the usual manner.

The large poles 4 are about two-thirds larger than the smaller poles 3. Thus we are enabled to balance the power in the shaded pole to that of the unshaded pole. The poles 4 have mounted on them the shading coils or plates 11.

It will be noted that the interior faces of the poles are arcuate so as to be brought in close parallel relationship with the periphery of the rotor generally designated 12, the exact construction of which will be hereinafter explained.

The laminations 1 are bolted together by the bolts 13 through the depending portions 6 and the laterally extending portions 5. They are also bolted together by the bolts 14 which project into the sleeves 15 of the gear box casing 16. The gear box 16 is a casing provided with supporting ears 17. The details of this gear box are not important.

Referring to the rotor of Figures 6 and 7, the rotor 12 is mounted on a shaft 18 which extends into the gear box 16 for driving the gears therein. 19 is a pinion on the outside of the gear box driven by the gears in the gear box so actuated by the shaft 18.

The rotor consists of the pair of spaced plates 20 and 21 that are identical with one another. These plates have struck-up ribs 22 arranged opposite to one another so that there are enlarged spaces 23 at predetermined intervals between the plates. Thus this rotor of thin heat-treated carbon steel is so drawn as to bring more metal into the rib areas 22 to form four synchronizing poles in the rotor disks. The disk-like shape of the plates 20 and 21 assures self-starting, and the bringing of more metal into the region of each of the four poles accomplishes synchronization.

An alternative form is shown in Figures 8 and 9, in which one or more disks 24 are pressed from annealed carbon steel so that the spoke sections constituting the four poles 25 and the rim 26 are left full thickness, while the intermediate areas 27 are thinner. This construction also gives a self-starting rotor and a self-starting motor. The rotor of Figures 8 and 9, after being so pressed with the indentations 27, is hardened.

Referring to Figures 10 and 11, a pair of metal disks are punched with four openings 28. The tongue material so punched to form the openings is turned backwardly and outwardly as at 29 so that an additional mass of material is provided where the tongues engage one another face to face between the respective disks of metal 30. The ends of the tongues just reach the outer rims of the disks.

It will be understood that we desire to comprehend within our invention such modifications as may be necessary to adapt it to varying conditions and uses.

It will be understood that with the four-pole rotor in this sub-synchronous bi-pole construction the speed is 1800 R. P. M. If the rotor is divided into six poles the speed will be 1200 R. P. M. By arranging the rotor in various divisions, various speeds may be secured.

Having thus fully described our invention, what we claim as new and desire to secure by Letters Patent, is:

1. A new article of manufacture for use as a rotor in a self-starting synchronous motor comprising spaced plates having struck-up ribs oppositely disposed to one another, said ribs being arranged to radiate from the center of the disk.

2. A new article of manufacture for use as a rotor in a self-starting synchronous motor comprising a metal disk having a plurality of poles consisting of radially disposed integral disk portions having a greater amount of metal than the area between the poles, and a peripheral rim of greater metal thickness than the central portions of said disk extending from pole to pole.

3. In a self-starting synchronous electric motor, the combination of an imperforate disk rotor having pole regions consisting of elongated disk portions integral with said disk rotor and raised above the level of the adjacent areas so as to locate more metal in the pole regions than elsewhere in the rotor, field poles, and a field coil associated with said field poles.

4. In a self-starting synchronous electric motor, the combination of a marginally imperforate disk rotor having pole regions consisting of elongated disk portions integral with said disk rotor and projecting relatively to the adjacent areas of the rotor so as to locate more metal in the pole regions than elsewhere in the rotor, field poles, and a field coil associated with said field poles.

5. In a self-starting synchronous electric motor, the combination of a marginally imperforate disk rotor with a smooth continuous rim and having pole regions consisting of elongated disk portions integral with said disk rotor and projecting relatively to the adjacent areas of the rotor so as to locate more metal in the pole regions than elsewhere in the rotor, field poles, and a field coil associated with said field poles.

6. In a self-starting synchronous electric motor, the combination of a marginally imperforate disk rotor having radially directed pole portions projecting relatively to the adjacent areas of the rotor so as to locate more metal in the pole regions than elsewhere in the rotor, field poles, and a field coil associated with said field poles.

7. In a self-starting synchronous electric motor, the combination of a marginally imperforate disk rotor having radially directed pole portions projecting relatively to the adjacent areas of the rotor so as to locate more metal in the pole regions than elsewhere in the rotor, field poles, and a field coil associated with said field poles, said pole portions being formed integral with said disk.

8. In a self-starting synchronous electric motor, the combination of a disk rotor having pole portions projecting radially from the surface of said rotor so as to locate more metal in the pole regions than elsewhere in the rotor, and a projecting portion interconnecting said pole portions.

9. In a self-starting synchronous electric motor, the combination of a disk rotor having pole portions projecting radially from the surface of said rotor so as to locate more metal in the pole regions than elsewhere in the rotor, and a projecting portion interconnecting said pole portions, said interconnecting portion encircling the axis of rotation of said rotor.

WILLIAM L. HANSEN.
IRA N. HURST.